Aug. 3, 1965 C. E. ATKINS ETAL 3,199,033

CONDITION RESPONSIVE CIRCUITS WITH PLURAL OUTPUTS
OF RELAXATION OSCILLATOR BALANCED

Filed Aug. 10 1964 2 Sheets-Sheet 1

INVENTORS
CARL E. ATKINS
ROBERT L. ZIOLKOWSKI
BY Eyre, Mann & Lucas
ATTORNEYS

Aug. 3, 1965 C. E. ATKINS ETAL 3,199,033

CONDITION RESPONSIVE CIRCUITS WITH PLURAL OUTPUTS OF RELAXATION OSCILLATOR BALANCED

Filed Aug. 10, 1964 2 Sheets-Sheet 2

INVENTORS
CARL E. ATKINS
ROBERT L. ZIOLKOWSKI
BY Eyre, Mann & Lucas
ATTORNEYS

United States Patent Office 3,199,033
Patented Aug. 3, 1965

3,199,033

CONDITION RESPONSIVE CIRCUITS WITH PLURAL OUTPUT OF RELAXATION OSCILLATOR BALANCED

Carl E. Atkins, Montclair, and Robert L. Ziolkowski, South Plainfield, N.J., assignors to Tung-Sol Electric Inc., a corporation of Delaware Filed Aug. 10, 1964, Ser. No. 388,644
9 Claims. (Cl. 328—5)

The present application is a continuation-in-part application of applications, Serial No. 115,503 filed June 1, 1961, now abandoned; Serial No. 222,045 filed September 7, 1962; Serial No. 277,888 filed May 3, 1963, and Serial No. 369,543 filed May 22, 1964, all of which are co-pending herewith.

The present invention relates to condition responsive circuits and more particularly to circuits which respond to body capacity and the like.

In accordance with the present invention, a condition responsive circuit is provided which employs a relaxation oscillator in combination with a condition responsive means and an output circuit to provide an output signal which responds to changes in the condition being monitored by the condition responsive means. This condition responsive circuit can take many forms as will be apparent from the description of four different embodiments of the present invention in the specification. However, in each case, the relaxation oscillator of the condition responsive circuit employs a non-linear device, such as a glow tube or a back biased semi-conducttor diode, in either the charging path or discharging path of a capacitor to cause either the rate of charging or discharging of the capacitor to be periodically varied so that there is a periodic variation in the potential across the capacitor. This periodic variation in the potential across the capacitor is employed by the output circuit to provide an output signal that can be controlled in magnitude by the condition responsive means which is connected to the condition responsive circuit so as to either vary the impedance of the capacitor or change the output circuit with changes in the condition which is being monitored.

For a better understanding of the present invention and the advantages thereof the following description of four embodiments thereof should be read in connection with the accompanying drawings of which:

Figure 1:
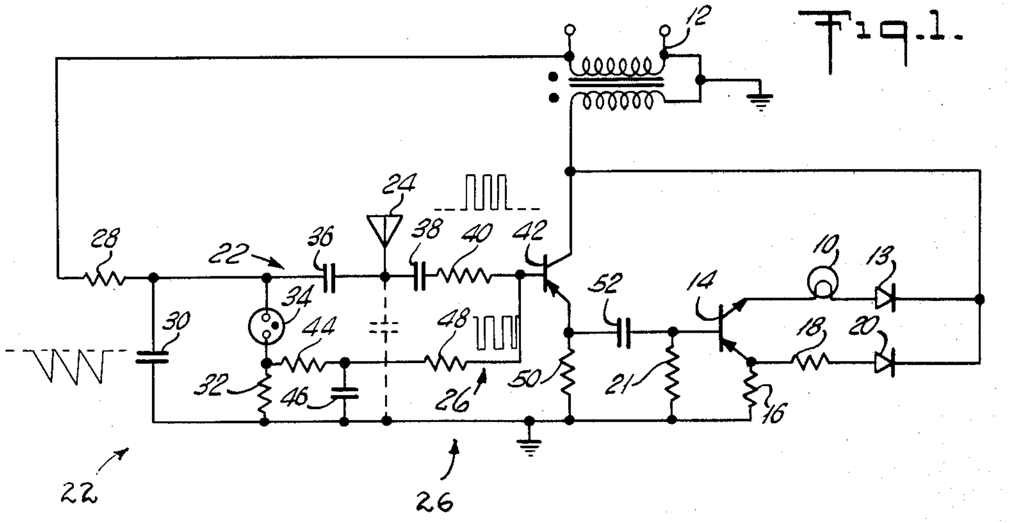
FIGURE 1, is an electrical schematic of one embodiment of the invention.

In the embodiment illustrated in FIGURE 1, the condition responsive circuit is shown as it could be employed in a circuit for controlling the lighting and extinguishing of a lamp 10. The lamp is connected across the capacitor. This periodic variation in the potential 13 the emitter collector path of a four zone semi-conductor device 14, such as a 2N1966, and a resistor 16. Connected in shunt with the lamp 10 and the emitter to collector path of the semi-conductor device 14, is a resistor 18 and a diode 20.

The primary of the transformer 12 is excited by the usual 115 volt 60 cycle line voltage applying an alternating potential across the mentioned circuit elements and lamp. The positive portions of this alternating potential are blocked from reaching the lamp 10 and the semi-conductor device 14 by the diode 13, which is back biased below its zener breakdown point during the positive portions. Diode 13 is not absolutely necessary and may be done away with by making the resistance of resistor 21 coupling the base of the semi-conductor device 14 to ground sufficiently large to prevent the lamp 10 from glowing due to any current which may flow through the collector to base path of the semi-conductor switching device 14 during the positive half cycles.

The negative portions of this alternating potential are applied across the lamp 10 and the semi-conductor switching device 14 because the diode 13 is forward biased. When its collector is negative with respect to its emitter, the semi-conductor device 14 acts as a switch which can be rendered conductive and non-conductive. Therefore, when the semi-conductor device 14 is rendered conductive current will flow through its emitter to collector path during the negative half cycles of the voltage applied across it, resistor 16, and the lamp 10 allowing the lamp to be lit by such current. Resistor 16 will not prevent the lamp 10 from lighting because its resistance is very small and allows the magnitude of the current flow to be large. When the semi-conductor device 14 is non-conductive no current will flow through its emitter to collector path so that it is in effect an opening in the circuit and prevents current from flowing through the lamp 10 during the negative half cycles. As was pointed out above, the diode 13 is back biased during the positive half cycles so that no current can flow through the lamp during the positive half cycles. Therefore, the lighting and extinguishing of the lamp 10 can be controlled by rendering the semi-conductor device 14 conductive and non-conductive respectively.

When the collector of the semi-conductor device is more negative than its emitter, the semi-conductor device can be rendered conductive by biasing its base more negative than its emitter. The particular semi-conductor device works much the same way as a thyratron, and once its base is biased more negative than its emitter it will remain conductive even though this negative bias has been removed, unless the base is subsequently made sufficiently positive with respect to the emitter or unless the current flow through the emitter to collector path falls below the sustaining level. The base of the semi-conductor switching device is normally biased positive with respect to its emitter by resistors 16, 18 and 21 and diode 20. During the negative half cycles, the diode 20 is forward biased allowing current to flow through it and the resistors 16 and 18. Since the base is connected to resistor 16 by resistor 21 current flow through resistor 16 biases the emitter of the semi-conductor switching device slight negative with respect to its base but not so negative that once rendered conductive the semi-conductive switching device would be rendered non-conductive by this bias.

To render the semi-conductor switching device 14 conductive a touch responsive circuit is provided. This circuit includes a relaxation oscillator 22, a touch responsive element 24 and a summing circuit 26.

The relaxation oscillator comprises a resistor 28 and a capacitor 30 connected in series across the primary of the transformer 12 and a resistor 32 and a glow discharge device 34 connected in shunt with the capacitor 30. As the 115 volt 60 cycle voltage increases in magnitude, either positively or negatively from zero, the capacitor 30 is charged by current flowing through the resistor 28. Eventually, the potential on the capacitor 30 caused by this charging exceeds the breakdown potential of the glow tube 34, and the charge on the capacitor 30 is discharged through the resistor 32 and the glow discharge device 34. Discharging of the capacitor continues until the current flow through the neon glow tube 34 falls below the minimum current necessary to sustain current flow through the tube. With this the tube extinguishes and cuts off the current flow through the discharge path so that the capacitor starts charging again to initiate a second charging and discharging cycle of the capacitor 30. The resistance of resistor 28 is much larger than the resistance of resistor 32 so that the charging time is longer than the discharging time. Because of this the voltage variation across the capacitor with each charging and discharging cycle resembles a sawtooth with a gradual increase in the magnitude of the voltage followed by a rapid drop in the magnitude of the voltage and the voltage across the resistor 32 in the discharge path resembles a pulse with a rapid rise in magnitude followed by a rapid fall in magnitude.

The values of resistor 28, the capacitor 30 and the resistor 32 are selected so that the repetition rate of the sawtooth and pulse shaped voltage waves is in the order of 2 to 4 kc. Therefore, a number of sawtooth and pulse shaped waves occur each positive and negative half cycle. During the positive half cycles it should be apparent that both the sawtooth waves across the capacitor and the pulses across the resistor will be positive and during the negative half cycles they will both be negative.

The summing circuit takes these two signals sum them together to give a resultant output. The summing circuit includes a first circuit which includes two capacitors 36 and 38 and a resistor 40 connected in series between the capacitor 30 and the base of a transistor 42 and a second which includes a lag network consisting of a resistor 44 and capacitor 46 connected in series across resistor 32 and a resistor 48 coupling the output of the lag network to the base of the transistor 42. The emitter to collector path through the transistor 42 is connected in series with a resistor 50 across the secondary of the transformer 12. Transistor 42 is normally biased non-conductive during the negative half cycles of the potential applied across the emitter to collector path of the transistor 42. However, it is not absolutely necessary that transistor 42 be biased non-conducting during the negative half cycles since any negative potential that would be produced across resistor 50 because transistor 42 was biased conductive would not bias the semi-conductor switching device 14 conductive because it would be blocked from reaching the base of the semi-conductor switching device 14 by the capacitor 52 which couples the resistor 50 across the base and emitter of the semi-conductor switching device.

The capacitor 36 blocks the 60 cycle alternating voltage and also blocks the lower frequency components of the sawtooth waves to produce a series of positive pulses on the transistor side of capacitor 36 when the collector of the transistor 42 is biased negative with respect to the transistor's emitter. The lag circuit lags the pulses produced across resistor 32 to provide a series of negative pulses on the transistor side of the lag circuit which are substantially similar to and in phase with the positive pulsese on the transistor side of capacitor 36. These pulses are serially summed at the base of the transistor 42 by the summing network. The resistances of the summing resistors 40 and 48 are selected so that the resultant pulses are of a null potential so as to not materially effect conduction through the transistor 42.

Therefore, the semiconductor switching device is normally kept-non-conducting by the bias provided across the resistor 16. However, when the touch responsive element 24 is contacted its adds body capacity between ground and the junction of capacitors 36 and 38 so that the body capacity added by the contact with the touch responsive element and the capacitor 36 act as a voltage divided to suppress the magnitude of the postive pulses in the summation. This makes the negative pulses dominant in the summation as long as the touch responsive element is contacted, causing rapid increase and decrease in current through transistor 42 and causing the voltage across the resistor 50 to follow the rapid negative fluctuations at the base of the transistor 42. These negative fluctuations across the resistor 50 are so rapid that they are not blocked by the blocking capacitor 52 and therefore render the semi-conductor switching device 14 conductive. As pointed out above, with the semi-conductor switching device 14 conductive the lamp 10 is enerized each negative half cycle and will remain lighted during the positive half cycles by thermal inertia as long as the semi-conductive switching device 14 is conductive the above described waveforms and pulses occurring at the crest of the negative half cycle of the supply voltage are diagrammatically shown in FIG. 1.

The semi-conductor switching device will remain conductive as long as the touch responsive element is contacted so as to supply negative pulses to the base of the semi-conductor switching device 14 each negative half cycle of the voltage applied across it. However, once contact is removed from the touch responsive element, the lamp 10 will be extinguished at the end of the first negative half cycle occuring thereafter when the current through the touch responsive element falls below the sustaining level. The lamp 10 will then remain off until the touch responsive element 24 is again contacted.

Figure 2:
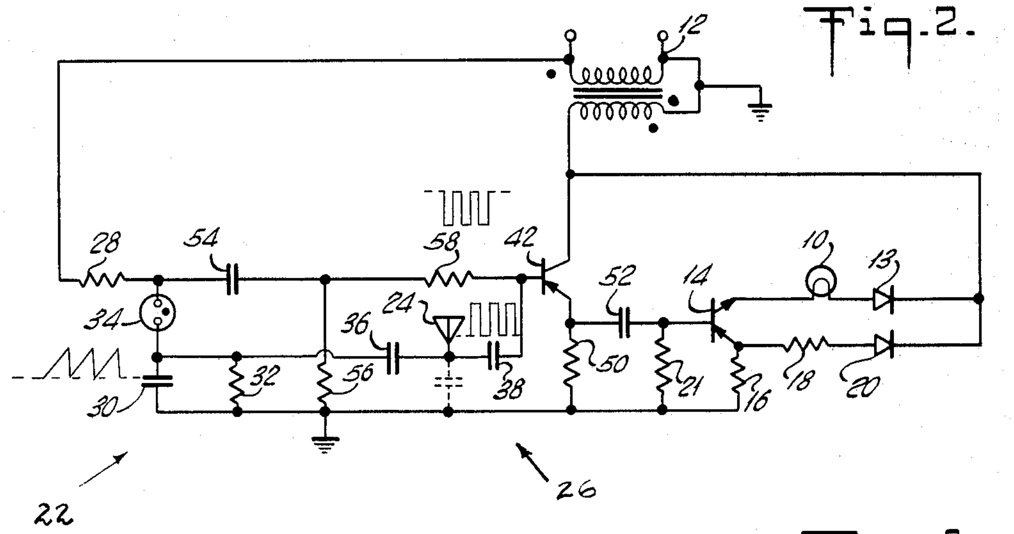
FIGURE 2, is an electrical schematic of a second embodiment of the invention.

In the circuit of FIGURE 1 the glow tube is in the discharge path of the capacitor however as shown by the embodiment of the invention illustrated in FIGURE 2 the glow tube may be in the charging path instead. In the embodiment of FIGURE 2, the glow tube 34 is connected in series with the resistor 28 and capacitor 30 instead of being in series with resistor 32. Also, there is no resistor 40 in the circuit between the capacitor 38 and the base of transistor 42. In addition, the charging resistor 28 is connected to the base of the transistor 42 by a differentiating circuit consisting of a capacitor 54 and a resistor 56 connected in shunt across the capacitor 30 and the glow tube 34 and by resistor 58 connecting the output of the differentiating circuit to the base of the transistor. Further with this circuit the secondary winding is reversed so that the voltage supplied to the transistor 42 and the semi-conductor switching device 14 is 180° out of phase with the voltage supplied to the relaxation oscillator.

Therefore, while the transistor 42 and semi-conductor switching device 14 are excited by negative half cycles of potential, positive half cycles of potential are applied across the charging resistor 28, the glow tube 34 and the capacitor 30. As each half cycle increases in potential it approaches the breakdown potential of the glow tube 34 and eventually exceeds it causing the glow tube to break down and conduct and allow the capacitor 30 to be charged through resistor 28. Eventually the charge on the capacitor 30 is sufficient to cut the current flow through the discharge tube 34 below the tubes sustaining level and the tube becomes extinguished opening up the charging path for the capacitor and thereby permitting the capacitor to discharge through resistor 32. Discharging through resistor 32 continues until the voltage across the glow tube 34 exceeds the breakdown potential of the tube and the tube again conducts. This produces a series of positive sawtooth voltage waves across both the glow tube 34 and the capacitor 30 in series and will produce a series of positive sawtooth waves across the capacitor 30 itself. The differentiating circuit blocks the 60 cycle A.C. line voltage and also blocks the lower frequency components of the sawtooth wave across the glow tube and the capacitor leaving negative pulses at the output of the differentiating circuit while the capacitor 36 blocks the lower frequency components of the sawtooth voltage waves across capacitor 30 to leave a series of positive pulses at the transistor side of the capacitor 36. The above described waveforms and pulses occurring at the crest of the positive half cycle of the supply voltage are shown diagrammatically in FIG. 2. As in the case of the embodiment of FIGURE 1 the summing circuit components are arranged to give a null output from the summing circuit at the base of the transistor 42 and when the touch responsive element 24 is contacted the magnitude of the positive train of pulses in the summation is suppressed by a dividing circuit comprising the capacitor 36 and the body capacity of the person contacting the touch responsive element. In all other respects the embodiment of the invention illustrated in FIGURE 2 operates exactly the same as the embodiment illustrated in FIGURE 1.

Figure 3:
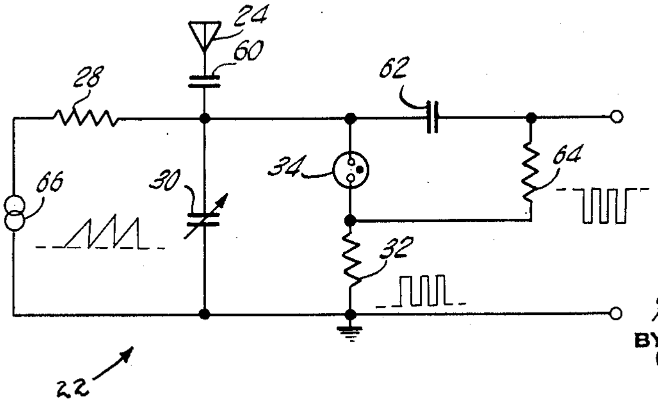
FIGURE 3, is an electrical schematic of a third embodiment of the invention.

In both embodiments of the invention so far described the touch responsive element has been connected in one of the paths of the summing circuit. In the embodiment of FIGURE 3 the touch responsive element 24 is connected by a capacitor 60 to the juncture of the charging resistor 28 and the capacitor 30. Also in this arrangement the output across the glow tube 34 is differentiated in a differentiating circuit consisting of a capacitor 62 and a resistor 64 and the output of the differentiating circuit is summed in parallel with the output across the discharging resistor 32.

With this arrangement when the flow from the 115 volt 60 cycle source of excitation 66 flows through the resistor 28 the capacitor 30 is charged raising the potential across the capacitor. When the voltage across capacitor 30 exceeds the breakdown potential of the glow discharge tube 34, the glow discharge tube conducts, discharging the capacitor 30 until the voltage across the capacitor becomes insufficient to maintain conduction in the glow discharge tube. Then the glow discharge tube 34 extinguishes and the capacitor 30 again starts charging towards the glow tube breakdown potential.

During the positive half cycles of the current drawn from the source 66 the alternate charging and discharging of capacitor 30 produces a series of positive sawtooth voltage waves across the glow tube and the discharging of capacitor 30 produces a series of positive voltage pulses across resistor 32. The 60 cycle component of the positive half cycle across capacitor 30 is blocked and sawtooth wave components of the positive half cycles are differentiated by the differentiating circuit, consisting of resistor 64 and a capacitor 62, to produce a series of negative pulses across resistor 64. Resistors 32 and 64 are connected in series to sum the positive pulses across resistor 32 with the negative pulses across resistor 64. The summation provides a single series of resultant pulses whose magnitude is equal to the difference between the magnitudes of the positive and negative pulses across resistors 32 and 64 respectively. These resultant pulses may be made either positive or negative and can be varied in magnitude depending on the selection of the relative resistance of resistors 32 and 64 and the relative capacitances of capacitors 30 and 62, making this particular circuit adaptable to a wide range of possible uses. The waveforms across the capacitor 30 and resistors 32 and 64 at the crest of the positive half cycle of the supply voltage are shown in FIG. 3.

Figure 4:
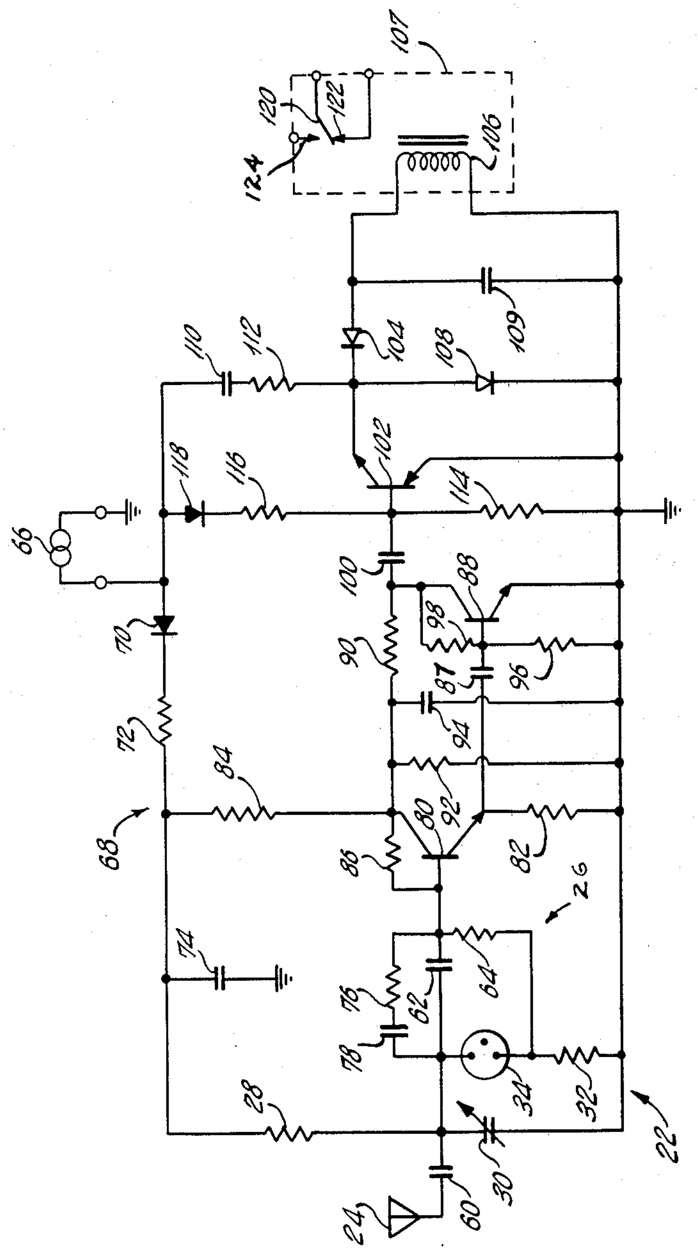
FIGURE 4, is a fourth embodiment of the invention.

This circuit can best be explained in connection with the embodiment of the invention disclosed in FIGURE 4. In this embodiment the capacitors 30 and 62 are charged from a D.C. power supply 68 which consists of a diode 70, a resistor 72 and a capacitor 74 connected in series across the terminals of the 115 volt 60 cycle source 66. The output of this power supply is connected to the charging resistor 28 so that the D.C. potential output of the power supply is applied across the variable capacitor 30 and current flows through resistor 28 from the D.C. power supply charging capacitors 30 and 62 with respect to ground. When either capacitor 30 or 62 exceeds the breakdown potential of the neon tube 34, the neon tube 34 breaks down and both capacitors 30 and 62 discharge through it. Discharge current for capacitor 30 travels from one side of the capacitor through the neon tube 34 and resistor 32 to the other side of the capacitor while the discharge current for capacitor 62 travels from the one side of the capacitor through the neon tube 34 and resistor 64. When the voltage on the capacitors 30 and 62 drop due to discharging through the neon tube 34, eventually the current through the neon tube 34 will fall below the level necessary for maintaining conduction in the neon tube 34 and the neon tube will extinguish, cutting off the discharge paths for the capacitors. With the discharge paths for the capacitors cut off they again start to be charged by the current flow through resistor 28 and thus the charging and discharging cycle repeats itself. This alternate charging and discharging of the capacitors 30 and 62 produces a series of pulses across each of resistors 32 and 64 which are summed to produce a differential output across both resistors since the current through these resistors is in opposite directions.

In this embodiment the value of capacitance of the capacitors 30 and 62 are equal as are the values of the resistors 32 and 64. Thus the differential output across the resistors 32 and 64 is theoretically the lowest voltage possible across the two resistors with the circuit operating as described above.

When a person approaches what has been referred to as the touch responsive element 24 he comes between the element 24 and ground so that the capacity between the element and ground is increased. This capacity is then added in series with capacitor 60 across capacitor 30, thus changing the total capacity between the ground and resistor 28. This increases the current flow through resistor 32 during discharging of the capacitors 30 and 62 thus changing the differential voltage across resistors 32 and 64 from the mentioned null value, making the total voltage across the resistors more positive.

This circuit makes it possible to detect changes in capacity between ground and the detecting element in the order of 1 to 3 picofarads. Due to the size of the change in capacity, the change in voltage across the resistors 32 and 64 is not very large. However, it is detectable and to increase its magnitude an amplifying circuit is employed.

As pointed out above, the capacitance of capacitors 30 and 62 are equal and the resistance of resistors 32 and 64 are equal. In the circuit disclosed in copending application, Serial No. 277,888, filed May 3, 1963, a similar oscillator was employed in which the values of the capacitors 30 and 62 and the resistors 32 and 64 were not selected to be equal but were seceted to give an imbalance voltage across the resistors rather than obtaining a null voltage across resistors 46 and 50. However, this previous circuit is not as sensitive as the present circuit and would only be able to reliably detect a 30 to 50 picofarad change in capacity between element 24 and ground. In addition, this previous circuit is much more sensitive to changes in the characteristics of the neon tube and to slight variations in the magnitude of the voltage supplied to it. The present oscillator circuit shows no such sensitivity to either changes in the characteristics of the neon tube 34 or the voltage supplied to charge the capacitors and has in addition been found to be extremely reliable besides being able to detect the very small changes in capacity.

With the oscillator circuit as so far described, it would be assumed that null voltage of the differential output across resistors 32 and 64 is quite small because capacitor 30 equals capacitor 62 and resistor 32 equals resistor 64. However, because the size of the change in magnitude of the differential output across resistors 32 and 64 caused by a 1 to 3 picofarad change in capacity is itself quite small, this null voltage is sufficient to interfere with the detection of this change in the differential output. Though it is not sure what causes this relatively large null voltage, it is assumed that it is due to the fact that resistors 32 and 64 are in the charging path of the capacitor 62 while there is no comparative resistance in the charging path of capacitor 30. However, no matter what the cause of this null voltage is, it has been found that employing a large resistance resistor 76 and a blocking capacitor 78 in shunt with capacitor 62 materially reduces the null voltage so it is no longer a factor in detection of the changes in the magnitude of the differential output across resistors 32 and 64 due to 1 to 3 picofarad change.

The differential output across resistors 32 and 64 is fed into the input of the above-mentioned amplifier. The amplifier has two stages. The first stage of the amplifier comprises a first transistor 80 with its base to emitter path connected across resistors 32 and 64 in series with a resistor 82, with a resistor 84 coupling its collector to the output of the D.C. power supply 68, and with a resistor 86 connecting its base to its collector, for bias and stability purposes.

The current amplified differential output from the first stage of the amplifier is fed into the second stage of the amplifier through a capacitor 86, coupling the emitter of the first transistor 80 to the base of a second transistor 88. The emitter of the second transistor 88 is connected to ground while the collector of the second transistor 88 is connected to the collector of the first transistor 80 through resistor 90. A resistor 92 and capacitor 94 are connected in shunt between the collector of the first transistor and ground for biasing and filtering purposes respectively, and a resistor 96 is connected between the base and the emitter of the second transistor 88 to bias the base with respect to the emitter. Like the first transistor 80, the second transistor 88 has a resistor 98 connecting its base to its collector for bias and stability purposes.

The output of the second stage of the amplifier or the collector of the second transisor 88 is connected by a capacitor 100 to the base of a germanium four layer PNPN semi-conductor switching device 102, such as a 2N1966. Connected in series between the collector and emitter of this semi-conductor switching device 102 is a diode 104 and the coil 106 of a relay 107. In shunt with the coil 106 is a capacitor 109 and in shunt across the emitter and collector is a diode 108.

The emitter to collector path of the semi-conductor switching device 102 is connected in series with a capacitor 110 and a resistor 112 across the source of excitation 66 so as to couple the A.C. source to the semi-conductor switching device. However, only negative current can flow through the semi-conductor switching device from the A.C. source because positive current is shunted past the semi-conductor switching device by the diode 108. Whether negative current A.C. actually will flow through the semiconductor switching device 102 will depend on the polarity of voltage on the base of the semi-conductor switching device which in turn depends on the combined output of a bias circuit and the oscillator 22.

The bias circuit consists of a resistor 114 connected between the base and emitter of the semi-conductor switching device and a resistor 116 and a diode 118 connected between the base of the semi-conductor device 102 and the ungrounded A.C. excitation terminal. This bias circuit normally supplies a positive potential to the base while the collector is negative. If a 1 to 3 picofarad change in capacity is not detected by the element 24 the pulses supplied by the oscillator through capacitor 100 are not sufficient to drive the base negative while the collector is negative. Therefore, normally the semi-conductor switching device 102 remains non-conductive during the negative half cycles of excitation applied thereacross. This means that current will flow through the capacitor 110, the resistor 112 and past the semi-conductor switching device through the diode 104 and the coil 106 during the negative half cycles. This current flow through the coil 106 is sufficient to energize the relay 107. Though positive current is shunted to ground by the diode 108, diode 104 isolates the coil 106 from the path to ground through the diode 108 during this time to prevent deenergization of the relay 107, so that the relay is energized all the time the semi-conductor switching device 102 is non-conductive.

With the relay 107 energized the armature 120 of the relay is in contact with contact 122.

When someone approaches the element 24 his body changes the capacity between the element 24 and ground. When this change amounts to more than 1 to 3 picofarads it changes the output across the resistors 32 and 64 to provide pulses greater in magnitude than those of the mentioned null potential. These pulses of increased potential are amplified by the amplifier and fed to the base of the semi-conductor switching device 102 in the form of negative pulses which drive the base of the semi-conductor switching device 102 sufficiently negative during the negative half cycles to cause it to conduct. When the semiconductor switching device 102 conducts, all excitation for the coil 106 is shunted past the coil, during positive half cycles by diode 108 and during negative cycles by the semi-conductor switching device. Therefore, the relay 107 becomes deenergized. With the relay 107 deenergized, the armature 120 moves away from the contact 122 and contacts contact 124. The relay 107 is reenergized when the person standing leaves the vicinity of element 24. This reduces the capacitance between the element 24 and ground more than 1 picofarad and therefore restores the differential output across the resistors 32 and 64 to null.

Because of the small changes in capacity to be detected between element 24 and ground it is possible that in certain environments where the humidity may vary considerably that a large increase in humidity may cause a sufficient increase in the capacity between the element 24 and ground that the relay will become accidentally energized or that a large decrease in humidity will prevent the relay from being energized when a person approaches the element 24 and causes the predetermined change in capacity between ground and the element 24. In such environments compensation for changes in humidity may be provided by making capacitor 62 an air dielectric capacitor so that the pulses across resistor 64 will change in magnitude in the same manner with changes in the humidity conditions as the magnitude of the pulses across resistor 32.

Four embodiments of the invention have now been described. It should be apparent from the variety of the circuits that the above invention can be adapted to a number of different applications. For instance in the first three embodiments, the present invention was applied to touch responsive applications. In the fourth embodiment the present invention was used to detect the presence of persons or objects which do not necessarily have to touch the element 24. It will be apparent to those skilled in the art that these circuits could be used to detect changes in capacity between ground and the element caused in any way whatsoever. And as described in copending application Serial No. 393,175, filed August 31, 1964, the invention herein may be applied to detect the level of liquids whether they be dielectric or conductive.

Further it will be noted that the present invention permits detection of very small changes in capacitance while employing a pulse repetition rate in the order of 2 to 4 kc. Therefore the oscillators do not effect radio reception to any material extent. However, while these circuits can be made quite sensitive they need not be so made if it is desirable to detect only large changes in capacitances.

Also, as discussed in connection with the last embodiment, condition responsive circuits employing the present invention may be made quite insensitive to changes in the values and characteristics of the elements employed in the circuits, the voltage supplied to the circuits and the surrounding environmental conditions.

Finally these circuits require very few active elements so that they are highly reliable.

Other advantages of the present invention will be apparent to those skilled in the art as well as changes which could be made in the foregoing embodiments without departing from the spirit and scope of the invention. Therefore, it should be understood that the present invention is not to be limited to the foregoing description of specific embodiments thereof but is to be determined by the spirit and scope of the accompanying claims.

What is claimed is:

1. A condition responsive circuit comprising
(a) a source of energy;
(b) a relaxation oscillator coupled to said source, said oscillator yielding two output signals;
(c) means for differentiating one of said output signals to produce a first series of pulses;
(d) means for converting the other of said output signals into a second series of pulses of polarity opposite to that of said first series of pulses;
(e) means for summing said pulses; and
(f) condition responsive means for changing the magnitude of one of said series of pulses to vary the summation effected by said last mentioned means.

2. A condition responsive circuit according to claim 1 wherein said relaxation oscillator is coupled to said source through a resistive circuit and wherein said oscillator includes a non-linear breakdown device and a resistor connected in series with said resistive circuit across said source, and a capacitor connected in shunt with said breakdown device and said resistor, one of said output signals being taken across said capacitor and the other of said output signals being taken across said non-linear breakdown device.

3. The condition responsive circuit according to claim 1 wherein said relaxation oscillator is coupled to said source through a resistive circuit and wherein said oscillator includes a non-linear breakdown device and a capacitor connected in series with said resistive circuit across said source, one of said output signals being taken across said non-linear breakdown device and the other of said output signals being taken across said non-linear breakdown device and capacitor.

4. A condition responsive circuit comprising:
(a) capacitive means for storing electrical charge;
(b) means for charging said capacitive means;
(c) means coupled across said capacitive means for discharging said capacitive means including:
(1) a non-linear device which breaks down and conducts once the voltage across the capacitive means exceeds a value which is determined by the characteristics of the device; and
(2) a resistance means in series with the capacitive means and the non-linear device;
(d) means for summing signals across the resistive means produced by the discharging of the capacitive means and across the non-linear device produced by the charging and discharging of the capacitive means to provide a differential output;

(e) said summing means including a differentiating circuit coupled across the non-linear device to differentiate the signal across said non-linear device;
(f) means for changing the impedance of the capacitive means in response to a change in the mentioned condition so as to cause the signals across the resistive means to vary and thus change the differential output.

5. The circuit of claim 4 wherein said non-linear device is a glow discharge device.

6. A condition responsive oscillating circuit comprising:
(a) two capacitive means which are connected at one side to a common junction point;
(b) two resistive means which are connected together at one end and which at their other ends are connected to the other sides of said capacitive means;
(c) charging means connected to said common junction point of said two capacitive means;
(d) a non-linear breakdown means connected between said junction point and the point of connection of said two resistive means for discharging said two capacitive means when the charge on the capacitive means is sufficient to cause the voltage across the non-linear breakdown means to exceed a level determined by the characteristics of the non-linear breakdown means thereby causing the capacitive means to be alternately charged and discharged; and
(e) condition responsive means for varying the impedance of one of said two capacitive means.

7. The condition responsive circuit of claim 6 including a capacitor and a resistor connected in series and across one of said capacitive means.

8. The condition responsive circuit of claim 6 wherein said non-linear breakdown means is at least one glow discharge tube.

9. The condition responsive circuit of claim 6 wherein said two capacitive means have substantially the same impedance and said two resistive means have substantially the same impedance.

References Cited by the Examiner

UNITED STATES PATENTS

| | | | |
|---|---|---|---|
| 2,343,987 | 3/44 | Lindray et al. | 331—67 X |
| 2,826,693 | 3/58 | Resnik | 328—66 X |
| 2,942,123 | 6/60 | Schuh. | |
| 2,999,208 | 9/61 | Ruehlemann | 331—130 X |
| 3,018,851 | 1/62 | Diamond et al. | |
| 3,111,608 | 11/63 | Boenning et al. | 317—148.5 X |
| 3,129,414 | 4/64 | Rice | 328—5 X |
| 3,129,415 | 4/64 | McKnight | 331—67 X |

JOHN W. HUCKERT, *Primary Examiner.*

UNITED STATES PATENT OFFICE

CERTIFICATE OF CORRECTION

Patent No. 3,199,033 August 3, 1965

Carl E. Atkins et al.

It is hereby certified that error appears in the above numbered patent requiring correction and that the said Letters Patent should read as corrected below.

Column 1, line 59, strike out "the capacitor. This periodic variation in the potential" and insert instead -- the secondary of a transformer 12 in series with a diode --; line 60, after "13" insert a comma; column 3, line 24, for "sum" read -- sums --; line 29, after "second" insert -- circuit --; line 57, for "pulsese" read -- pulses --; line 64, for "kept-non-conducting" read -- kept non-conducting --; column 6, line 46, for "seceted" read -- selected --.

Signed and sealed this 12th day of April 1966.

(SEAL)
Attest:

ERNEST W. SWIDER
Attesting Officer

EDWARD J. BRENNER
Commissioner of Patents